(12) United States Patent
Verma et al.

(10) Patent No.: US 7,763,099 B2
(45) Date of Patent: Jul. 27, 2010

(54) DOWNHOLE SEPARATION OF CARBON DIOXIDE FROM NATURAL GAS PRODUCED FROM NATURAL GAS RESERVOIRS

(75) Inventors: Sandeep Verma, Acton, MA (US); Terizhandur S. Ramakrishnan, Boxborough, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 457 days.

(21) Appl. No.: 11/956,414

(22) Filed: Dec. 14, 2007

(65) Prior Publication Data

US 2009/0151559 A1 Jun. 18, 2009

(51) Int. Cl.
*B01D 53/02* (2006.01)
(52) U.S. Cl. .................... 95/96; 95/139; 96/121
(58) Field of Classification Search .............. 95/96, 95/139; 96/121
See application file for complete search history.

(56) References Cited

U.S. PATENT DOCUMENTS 5,085,674 A 2/1992 Leavitt 6,584,803 B2 * 7/2003 Oakey .................. 62/621

OTHER PUBLICATIONS

Diagne et al., New PSA Process with Intermediate Feed Inlet Position and Operated with Dual Refluxes: Application to Carbon Dioxide Removal and Enrichment, J. Chem. Eng. Jpn., 1994, vol. 27, No. 1, pp. 85-89.
Diagne et al., Parametric Studies on CO2 Separation and Recovery by Dual Reflux PSA Process Consisting of Both Rectifying and Stripping Sections, Ind. Eng. Chem. Res., 1995, vol. 34, pp. 3083-3089.
Diagne et al., Numerical Analysis of a Dual Refluxed PSA Process During Simultaneous Removal and Concentration of Carbon Dioxide from Air, J. Chem. Technol. Biotechnol., 1996, vol. 65, pp. 29-38.
Liu et al., Simulation of Gasoline Vapor Recovery by Pressure Swing Adsorption, Sep. Purif. Technol., 2000, vol. 20, pp. 111-127.
McIntyre et al., High Enrichment and Recovery of Dilute Hydrocarbons by Dual Reflux Pressure-Swing Adsorption, Ind. Eng. Chem. Res., 2002, vol. 41, pp. 3499-3504.

* cited by examiner

*Primary Examiner*—Robert A Hopkins
(74) *Attorney, Agent, or Firm*—Vincent Loccisano; James McAleenan; Brigid Laffey

(57) ABSTRACT

Methods and systems are provided where a production gas stream including natural gas and carbon dioxide is separated downhole using dual reflux pressure swing adsorption with the natural gas being produced and the carbon dioxide being directed for downhole storage (sequestration).

20 Claims, 5 Drawing Sheets

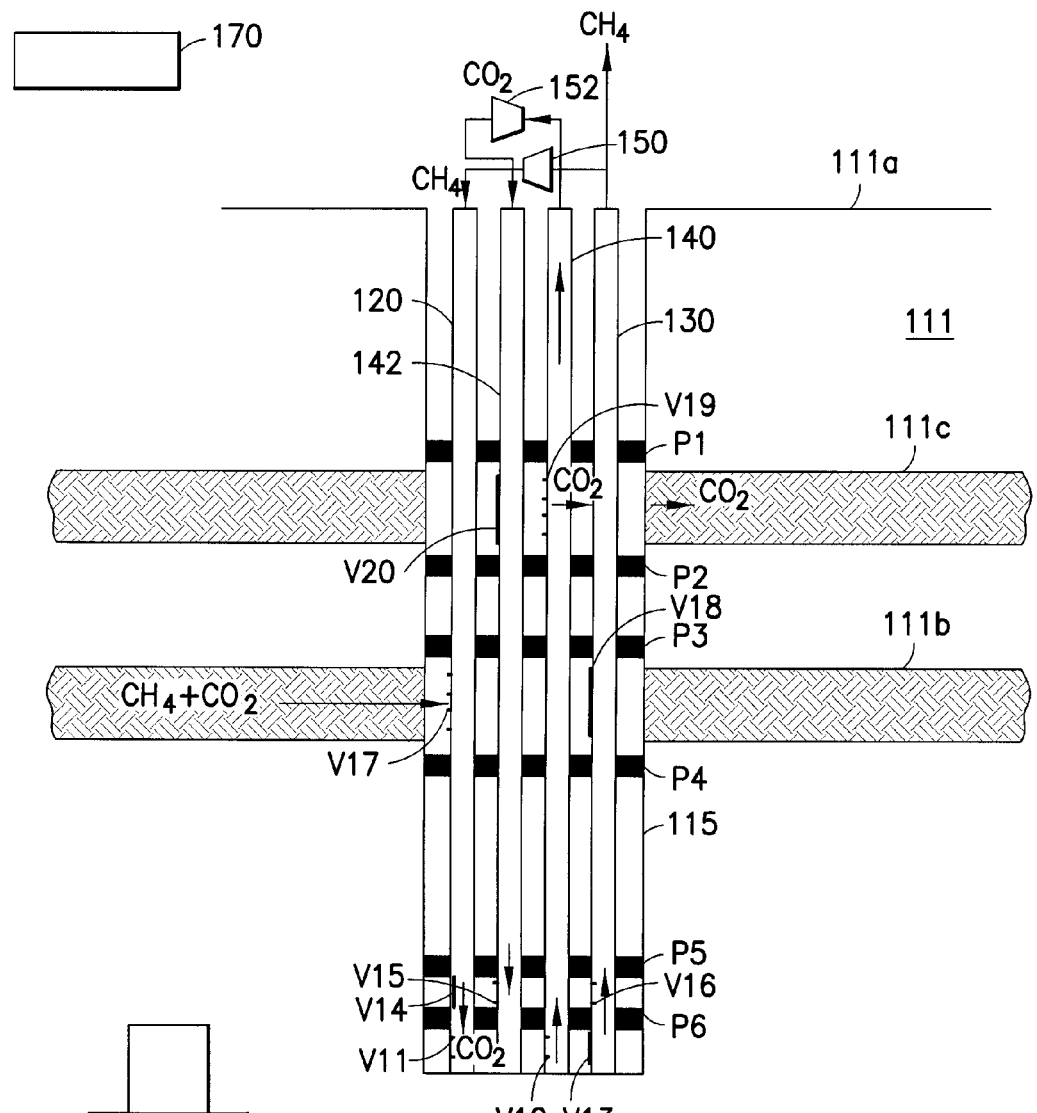
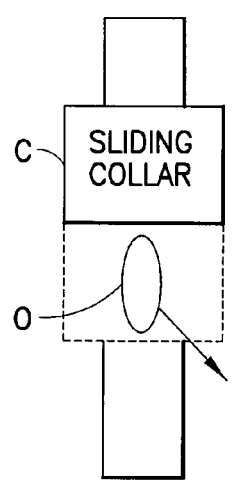
FIG.4b
FIG.5

DOWNHOLE SEPARATION OF CARBON DIOXIDE FROM NATURAL GAS PRODUCED FROM NATURAL GAS RESERVOIRS

BACKGROUND OF THE INVENTION

1. Field of the Invention

This invention relates broadly to hydrocarbon production from geological formations. More particularly, this invention relates to the production of natural gas where carbon dioxide is separated from the natural gas downhole and sequestered downhole.

2. State of the Art

Separation of natural gas/carbon dioxide mixtures is of key economic importance in producing gas fields with low to high carbon dioxide contents. As natural gas continues to provide an increasing share of energy needs worldwide and global warming is accepted as a reality, "green" production of natural gas is expected to assume increasing importance.

Traditionally, the separation of carbon dioxide from natural gas is carried out by absorption-distillation, chemisorption or physisorption. For example, Statoil uses amine (MEA-monoethanol amine) absorption technology to separate carbon dioxide from natural gas on an off-shore platform in the North Sea where a natural gas/carbon dioxide mixture is extracted to the surface (platform), separated at the surface, and the carbon dioxide is then compressed and injected into a saline aquifer. While this technology may be useful in very limited situations, it is expensive and unsuitable for most applications as it requires extensive quantities of MEA and energy for distillation.

For purposes herein, the terms "methane", "natural gas" and "CH4" are used interchangeably, although technically natural gas may include gases other than methane which is typically its primary and overwhelmingly largest component.

SUMMARY OF THE INVENTION

According to one aspect of the present invention, methods and systems are provided downhole for separating carbon dioxide from natural gas co-produced from a reservoir.

According to another aspect of the present invention, methods and systems are provided where a natural gas—carbon dioxide mixture is separated downhole with the natural gas being produced and the carbon dioxide being directed for downhole storage (sequestration).

According to another aspect of the invention, a pressure swing adsorption (PSA) process is used downhole to separate natural gas from carbon dioxide being co-produced from a natural gas reservoir.

In a further aspect of the invention, a PSA process using concentric packed beds is provided downhole to separate natural gas from carbon dioxide.

In another aspect of the invention, a PSA process using adjacent packed beds is provided downhole to separate natural gas from carbon dioxide.

According to yet another aspect of the invention, a PSA process is used downhole to separate natural gas from carbon dioxide, and a compressor is located at the formation surface for compressing the carbon dioxide and for redirecting it for sequestration to a carbon-dioxide injection zone downhole.

According to certain embodiments of the invention, the system comprises concentric tubes arranged as two packed PSA beds located in a downhole well, another concentric tube or annulus for carbon dioxide located in the downhole well, a compressor for compressing purified carbon dioxide, and plurality of valves coupled to the PSA beds, to the carbon dioxide tube, to the compressor, to a natural gas—carbon dioxide source location, and to the purified natural gas stream, at least some of which are located in the downhole well.

According to another embodiment of the invention, the system comprises at least three substantially parallel tubes, including two packed PSA beds, at least one tube for carbon dioxide, a compressor for compressing purified carbon dioxide, and a plurality of valves coupled to the PSA beds, to the compressor, and to the purified natural gas stream, at least some of which are located in the downhole well.

According to embodiments of methods of the invention, using any of the systems of the invention, a natural gas-carbon dioxide mixture is directed from a formation into a first of the two packed PSA beds which are arranged as a dual reflux PSA system. Depending upon the system, the first of the two packed PSA beds may be a high pressure bed or a low pressure bed. In a high pressure bed, carbon dioxide is preferentially adsorbed and methane is stripped or pushed out, whereas in a low pressure bed, methane is adsorbed and carbon dioxide is stripped or pushed out. If the carbon dioxide sequestration layer is at a low pressure, some of the carbon dioxide stripped from the low pressure bed may be forwarded for sequestration, while the balance of the carbon dioxide from the low pressure bed is compressed by the compressor of the system. The compressed carbon dioxide may be injected into one end of the high pressure bed. Where the carbon dioxide sequestration layer is at a higher pressure than the low pressure bed, the carbon dioxide which is pushed out is compressed by the compressor, and some compressed carbon dioxide may be injected into an end of the high pressure bed while the remainder is forwarded for sequestration. Similarly, most of the methane is provided as an output stream, while some of the methane may be injected into the low pressure bed. Whenever the purity of the output methane stream or the carbon dioxide stream decreases to a threshold level, the high pressure bed and low pressure beds are swapped (switched), and if the natural gas-carbon dioxide mixture was originally directed into the low pressure bed, it is now directed to the new low pressure bed; whereas if it was originally directed into the high pressure bed, it is now directed to the new high pressure bed.

Advantages of the invention will become apparent to those skilled in the art upon reference to the detailed description taken in conjunction with the provided figures.

BRIEF DESCRIPTION OF THE DRAWINGS

FIGS. 4a and 4b are schematics showing different parts of a cycle of a fourth embodiment of the invention for separation downhole of a natural gas-carbon dioxide mixture.

FIG. 4c is a top view of FIG. 4a.

FIG. 5 is a schematic of a sliding collar valve used in conjunction with the embodiment of FIGS. 4a and 4b.

DETAILED DESCRIPTION OF THE PREFERRED EMBODIMENTS

Figure 1:
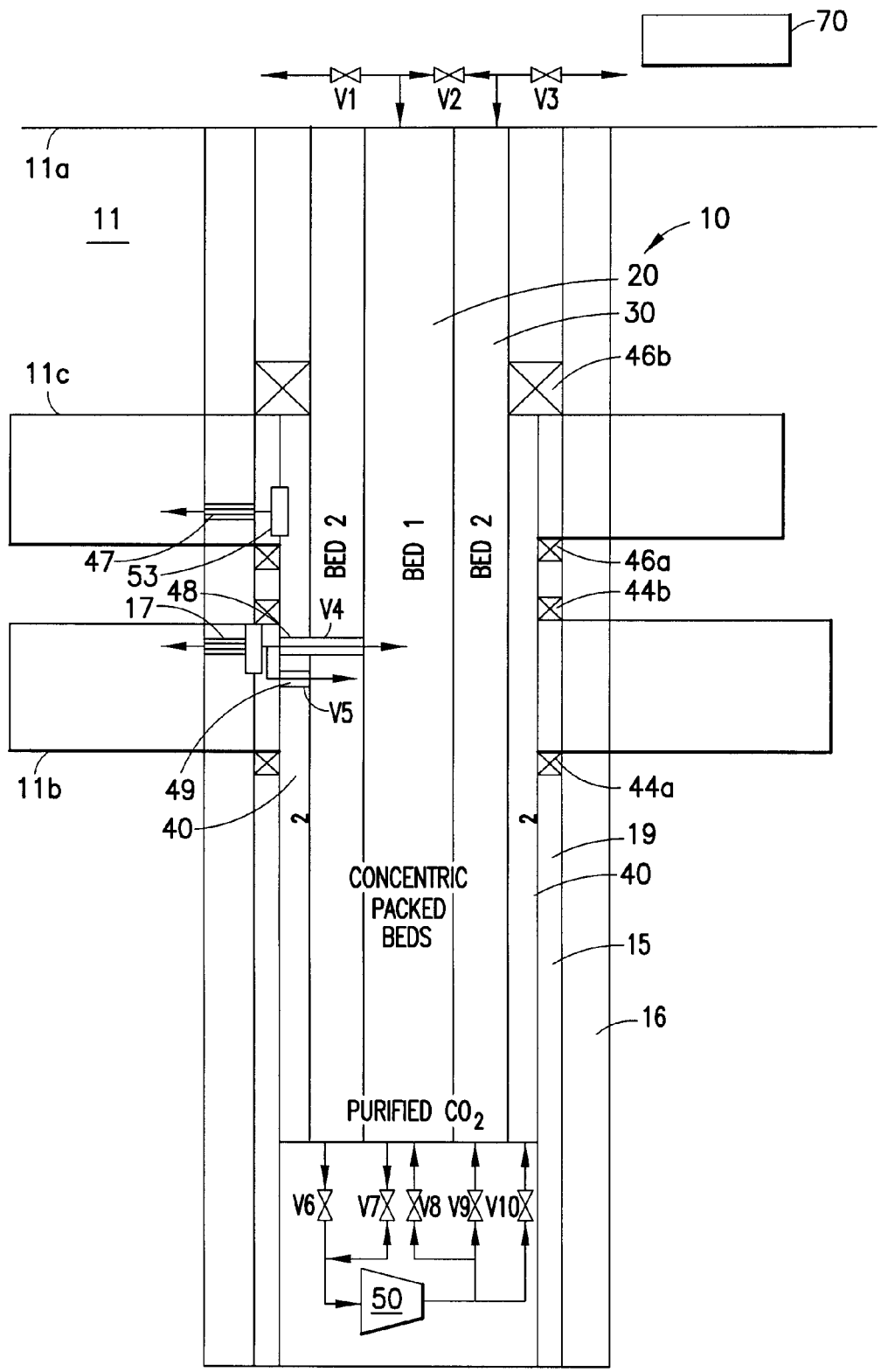
FIG. 1 is a schematic of a first embodiment of the invention for separation downhole of a natural gas-carbon dioxide mixture.

A basic system 10 of the invention for separating downhole a natural gas-carbon dioxide source gas mixture is seen in schematic form in FIG. 1 located in a formation 11. Formation 11 is shown with a surface 11a and several zones, including a reservoir zone 11b containing a mixture of natural gas as carbon dioxide, and a sequestration zone 11c into which carbon dioxide can be injected and stored. Formation 11 is traversed by a completed (cased) well 15 which is typically between eight and fourteen inches in outer diameter, although it tapers as it extends down into the formation. Although the figures are shown with a single casing, as is well known in the art of well completions, multiple casing strings are used to complete a well with a liner usually deployed from a casing shoe. Cement 16 is pumped between the casing/liner and the formation. The casing and cement are perforated (e.g., at 17) to make a flow connection to the formation. In typical production arrangements, a production or injection tubing, usually two to four inches in diameter is deployed in the well, with the area between the casing and the tubing forming an annulus 19. Packers between the tubing and the casing (i.e., in the annulus) are used to isolate the zone of interest.

As seen in FIG. 1, according to one aspect of the invention, the system 10, much of which is located in the completed well 15, includes concentric pressure swing adsorption (PSA) beds 20, 30 an unpacked annulus tube for carbon dioxide 40 concentric and extending around the PSA beds 20, 30, a compressor 50 located in the well 15, and a plurality of valves such as valves V1-V10 located in or about the well 15 or on the surface 11a of the formation 11. The system also preferably includes packers 44a, 44b, and 46a, 46b for isolating the production (source) zone 11b and sequestration zone 11c as will be described below.

The PSA beds 20, 30 of system 10 are formed from metal or fiberglass tubes of desired mechanical strength and chemical inertness which are packed with a desired adsorbent such as activated carbon, although a silica gel, zeolite, carbon molecular sieve material, or any adsorbent with different adsorption characteristics for natural gas and carbon dioxide at the temperatures and pressures of interest may be utilized. The carbon dioxide annulus tube may 40 as shown extends only as far as the sequestration zone 11b, but may extend the full length of the PSA beds 20, 30 if desired. Packers 44a and 44b are shown in the annulus 19 around the carbon-dioxide tube 40, and isolate the production zone 11b so gas from zone 11b can be directed into beds 20 and 30 as described hereinafter. Packer 46a is also located in the annulus 19 around the carbon-dioxide tube 40 at the lower end of the sequestration zone, while packer 46b is located in the annulus 19a between the casing 15 and bed 30 at the upper edge of the sequestration zone 11c for directing carbon dioxide under pressure (as described hereinafter) into the sequestration zone 11c via perforations (e.g., 47) in the casing.

Valves V1, V2, and V3 are shown at the formation surface 11a and are used to handle purified natural gas, which is the desired output of the system. As indicated, and as will be discussed in more detail hereinafter, natural gas may exit either of beds 20 or 30, and some of the purified natural gas may be reinjected into the other bed in order to carry out the dual reflux PSA process. Thus, if bed 20 is the relatively high pressure bed (compared to bed 30), and purified natural gas is exiting bed 20 at the top of the bed, with valve V1 open, valve V2 open, and valve V3 closed, some of the purified natural gas will flow through valve V1 as product and some of the purified natural gas will be directed via valve V2 for injection into the lower pressure bed 30 for regeneration of the bed 30. Similarly, if bed 30 is the relatively high pressure bed (compared to bed 20), and purified natural gas is exiting bed 30 at the top of the bed, with valve V3 open, valve V2 open, and valve V1 closed, some of the purified natural gas will flow through valve V3 as product, and some of the purified natural gas will be directed via valve V2 for injection into the relatively lower pressure bed 20 for regeneration thereof. As will be discussed hereinafter, the relative pressures of beds 20 and 30 is switched back and forth in the provided system 10.

Valves V4 and V5 are the valves which control the flow of the reservoir gas mixture from reservoir zone 11b into the beds 20, 30. Valve V4 is used to direct the reservoir gas mixture into bed 20 while valve V5 is used to direct the reservoir gas mixture into bed 30. Generally, when valve V4 is open, valve V5 is closed, and vice versa. In this embodiment, the natural gas from the formation is directed into the low-pressure bed. As shown in FIG. 1, valve V4 is located in a tube 48 which extends from bed 20 through bed 30 and tube 40 to the annulus 19 which is isolated by packers 44a, 44b, while valve V5 is located in a tube 49 which extends from bed 30 through tube 40 to the annulus 19. Tubes 48 and 49 are preferably preformed in the annulus 19 (and bed 30) as part of a modular arrangement and are to be located adjacent the perforation 17. Alternatively, the valves could be located at end of the tubes in the annulus 19.

Valves V6, V7, V8, V9 and V10, and compressor 50 are shown located in the cased well 15 below the beds 20, 30 and unpacked annular tube 40, and are provided to handle the carbon dioxide which is separated from the natural gas and which is being reinjected into the formation for sequestration. Valves V6-V10 and compressor 50 are preferably formed as a pre-assembly which may be arranged in a tube or pipe which is lowered downhole before the bed assembly (beds 20, 30 and tube 40) is lowered into place. When the bed assembly is lowered into the cased well (in one or more sections), the lowest portion of the bed assembly would couple to the valve assembly. As shown, valves V6 and V9 are coupled to bed 30, valves V7 and V8 are coupled to bed 20, and valve V10 is coupled to tube 40.

In operation, if bed 20 is the relatively low pressure bed (compared to bed 30), valves V7, V9 and V10 are open and valves V6 and V8 are closed. Thus, carbon dioxide exits bed 20 via valve V7, is compressed by compressor 50, and the compressed carbon dioxide is forwarded via valve V10 into the annulus 40 for sequestration in zone 11c. In addition, some compressed carbon dioxide is reinjected via valve V9 into the relatively high pressure bed 30. The injection of compressed carbon dioxide into bed 30 serves to pressurize the bed and to push the natural gas out of the bed as the carbon dioxide is preferentially adsorbed. Similarly, if bed 30 is the relatively low pressure bed (compared to bed 20), valves V6, V8 and V10 are open, and valves V7 and V9 are closed. Thus, carbon dioxide exits bed 30 via valve V6, is compressed by compressor 50, and the compressed carbon dioxide is forwarded via valve V10 into the annulus 40 for sequestration in zone 11c (via opening 53 in tube 40 and perforation 47 in the casing/cement). In addition, some compressed carbon dioxide is reinjected via valve V8 into the relatively high pressure bed 20. The injection of compressed carbon dioxide into bed 20 serves to pressurize the bed and to push the natural gas out of the bed as the carbon dioxide is preferentially adsorbed.

With the system 10 as provided, a dual reflux PSA process is implemented downhole for separating a mixture of natural gas and carbon dioxide, and for producing the natural gas and for sequestering downhole the carbon dioxide. Dual reflux PSA processes are described in D. Diagne et al., "New PSA Process with Intermediate Feed Inlet Position and Operated with Dual Refluxes: Application to Carbon Dioxide Removal and Enrichment", *J. Chem. Eng. Jpn.* 27 p. 85 (1994); D. Diagne et al., "Parametric Studies on CO2 Separation and Recovery by Dual Reflux PSA Process Consisting of Both Rectifying and Stripping Sections", *Ind. Eng. Chem. Res.* 34, p. 3083 (1995); and D. Diagne et al., "Numerical Analysis of a Dual Refluxed PSA Process During Simultaneous Removal and Concentration of Carbon Dioxide Gas from Air", *J. Chem. Technol. Biotechnol.*, 65 p. 25 (1996), all of which are hereby incorporated by reference herein in their entireties. More particularly, the source stream of a natural gas—carbon dioxide mixture from the reservoir 11*b* is provided to bed 20 or bed 30 at an intermediate position along the bed as shown. In system 10, the feed is to the bed which is at the relatively low pressure. Thus, assuming bed 20 is initially the low pressure bed, valve V4 is opened and valve V5 is closed, and the source stream is fed to bed 20 where the flow will be top to bottom. In addition, valves V2 and V3 will be open, with purified methane being injected via valve V2 into the top of bed 20. With the source stream feed into the middle of bed 20 and with purified methane being fed into the top, carbon dioxide is preferentially pushed out of the bed while methane is preferentially adsorbed in the bed. At the bottom of bed 20, valves V7, V9 and V10 are open and valves V6 and V8 are closed. As a result, purified carbon dioxide exiting the bed 20 is provided via valve V7 to the compressor 50. Much of the compressed carbon dioxide is directed into the tube 40 which is blocked above formation zone 11*c* by packer 46*b*, and therefore, that compressed (higher pressure) carbon dioxide is directed into formation zone 11*c* for sequestration therein. The remainder of the compressed carbon dioxide is provided via valve V9 to the bottom of bed 30. As a result, bed 30 is maintained at a higher pressure, and gas flow through the bed is established from bottom to top. Because bed 30 is at a higher relative pressure, carbon dioxide gas is preferentially adsorbed, and natural gas previously adsorbed in the bed is desorbed and pushed out of the bed. Thus, purified natural gas is obtained at the top of bed 30. Most of that natural gas is taken via valve V3 as desired product. However, as previously mentioned, some of the purified natural gas is injected via valve V2 into the top of the low pressure bed 20.

At some point in time, either when the purity of the natural gas exiting valve V3 (or the purity of the carbon dioxide exiting valve V7) decreases to an undesired level, or after a predetermined length of time (typically dependent upon factors such as the flow rate, the bed length, and the bed diameter), or after a predetermined amount of natural gas has been taken as desired product, the beds 20, 30 are swapped. More particularly, valve V4 is closed and valve V5 is opened so that the source stream feed is provided to the middle of bed 30 instead of bed 20. In addition, valve V8 is opened and valve V9 closed in order to force bed 20 to become the relatively high pressure bed and to provide carbon dioxide to the bottom of bed 20. Further, valve V6 is opened, valve V7 is closed so that carbon dioxide is obtained via valve V6 for compression by compressor 50, and valve V1 is opened while valve V3 is closed so that the desired product is taken via valve V1. Valve V2 now works to reinject purified natural gas obtained from bed 30 into the top of bed 20 instead of obtaining purified natural gas from bed 20 and reinjecting it into the top of bed 30. At some later point in time, when the purity of the natural gas exiting valve V1 (or the purity of the carbon dioxide exiting valve V6) decreases to a threshold level, the beds 20, 30 are again swapped, with related valves opened and closed as required. The swapping continues back and forth as one bed produces purified natural gas at the top of the well 15, and the other bed produces purified carbon dioxide in the well 15 at the bottom of the bed. The system is run in a balanced manner (equilibrium) such that the amount of gas entering the well (i.e., the total of the natural gas and carbon dioxide in the source mixture) is equal to the total of the natural gas taken as product plus the carbon dioxide gas injected into sequestration zone 11*c*.

It will be appreciated by those skilled in the art that the valves may be controlled from uphole (at the formation surface) by wiring the valves with wires (not shown) coupled to a controller 70. The wires from the downhole valve/compressor assembly (valves V6-V10 and compressor C1) may extend through the annulus 19, and through the packers 44*a*, 44*b*, 46*a*, 46*b*. Alternatively, the wires may extend through the packed beds 10, 20 and/or through the carbon-dioxide tube 30. Similarly, wiring for valves V4 and V5 may extend through annulus 19 through packers 44*b*, 46*a*, 46*b*, or through tube 30. It will also be appreciated by those skilled in the art additional equipment (not shown) may be supplied for testing the purity of the natural gas and/or the purity of the carbon dioxide exiting the beds 20, 30. Further, it will be appreciated that while the source gas layer 11*b* is shown to be almost exactly adjacent the midpoint of the beds 20, 30, the beds 20, 30 could be arranged such that the source gas layer 11*b* is closer to the top or bottom. More particularly, if the concentration of carbon dioxide in the source gas is relatively low, then the feed will preferably be located closer to the end the beds producing purified natural gas. Conversely, if the source gas has a majority of carbon dioxide, then the feed stream will preferably be located closer to the end of the beds producing the pure carbon dioxide. Further yet, it will be appreciated by those skilled in the art that the volume of beds 20 and 30 are preferably equal. However, the volume of annulus 40 need not be equal to, and is typically less than the volume of beds 20 and 30.

Figure 2:
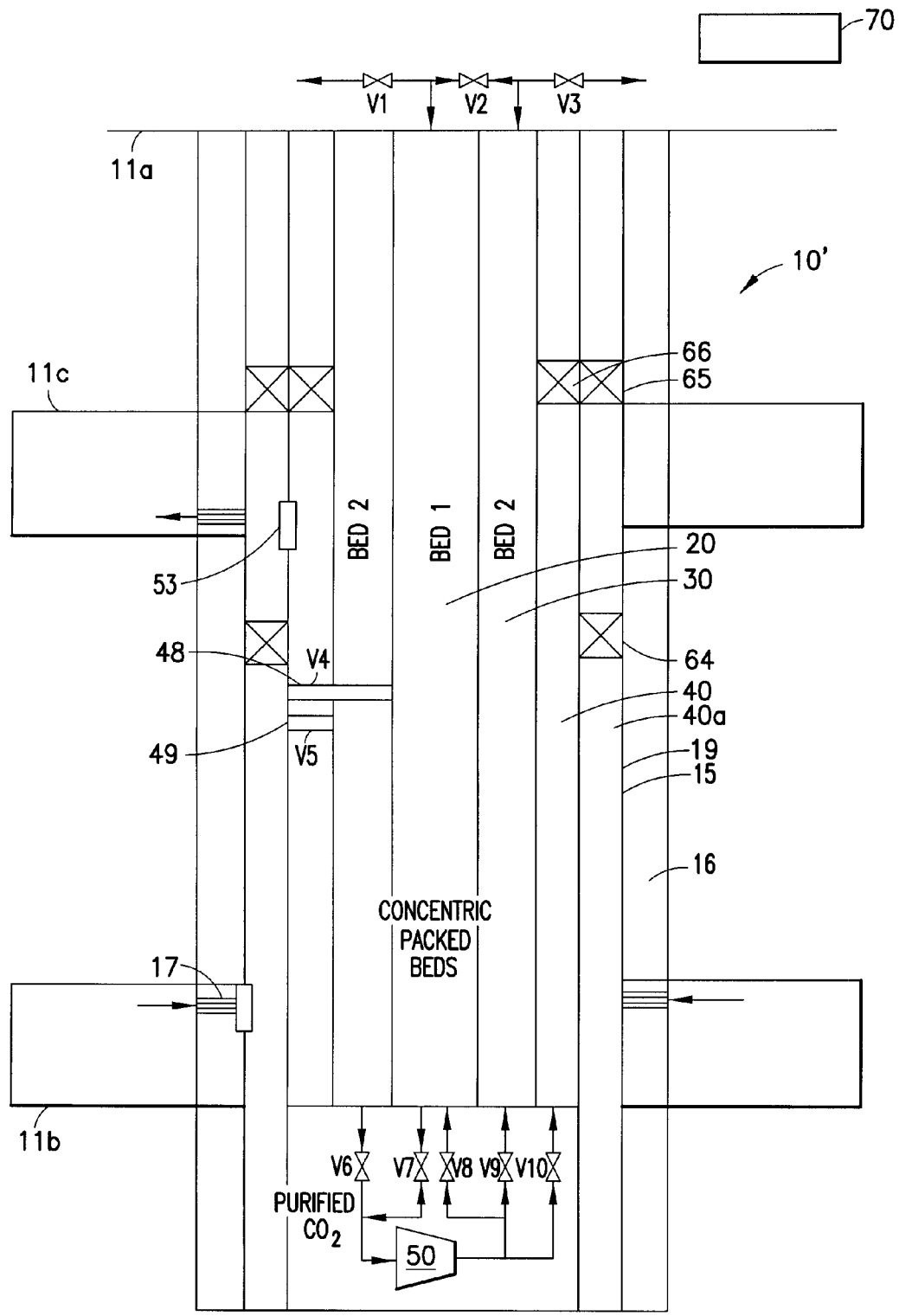
FIG. 2 is a schematic of a second embodiment of the invention for separation downhole of a natural gas-carbon dioxide mixture.

Turning now to FIG. 2, a system 10' similar to the system 10 of FIG. 1 is provided for separating downhole a natural gas-carbon dioxide mixture. In FIG. 2, elements which are the same as the elements of FIG. 1 are provided with the same reference numbers and function in the same manner. The primary difference between the system 10' and system 10 is the use of different packers or internal seals 64, 65, 66. In addition, if desired a second unpacked annulus 40*a* in the form of a pipe which is located around annulus pipe 40 may be used in lieu of annulus 19 (the outer annulus in FIG. 2 being labeled with both numbers 40*a* and 19). As seen in FIG. 2, the reservoir zone 11*b* containing a mixture of natural gas as carbon dioxide is located adjacent the bottom of the beds 20, 30. Annulus 19/40*a* carries the source gas uphole and packer 64 is provided to stop the upward flow of the natural gas-carbon dioxide mixture and direct it through tubes 48 and 49 which couple the annulus 19/40*a* and beds 20 and 30. In this manner, the source gas will flow from zone 11*b*, through annulus 19/40*a* directly into valve V4 or V5 and into bed 20 or 30. Similarly, packers 65 and 66 are located in annulus 19/40*a* and carbon dioxide tube 40 respectively and adjacent the carbon dioxide injection zone 11*c* in order to direct the carbon dioxide into zone 11*c* for sequestration. The system 10' of FIG. 2 functions substantially identically to the system 10 of FIG. 1 except for the relocation of the source gas through annulus 19/40*a* to the middle of the beds.

Figure 3:
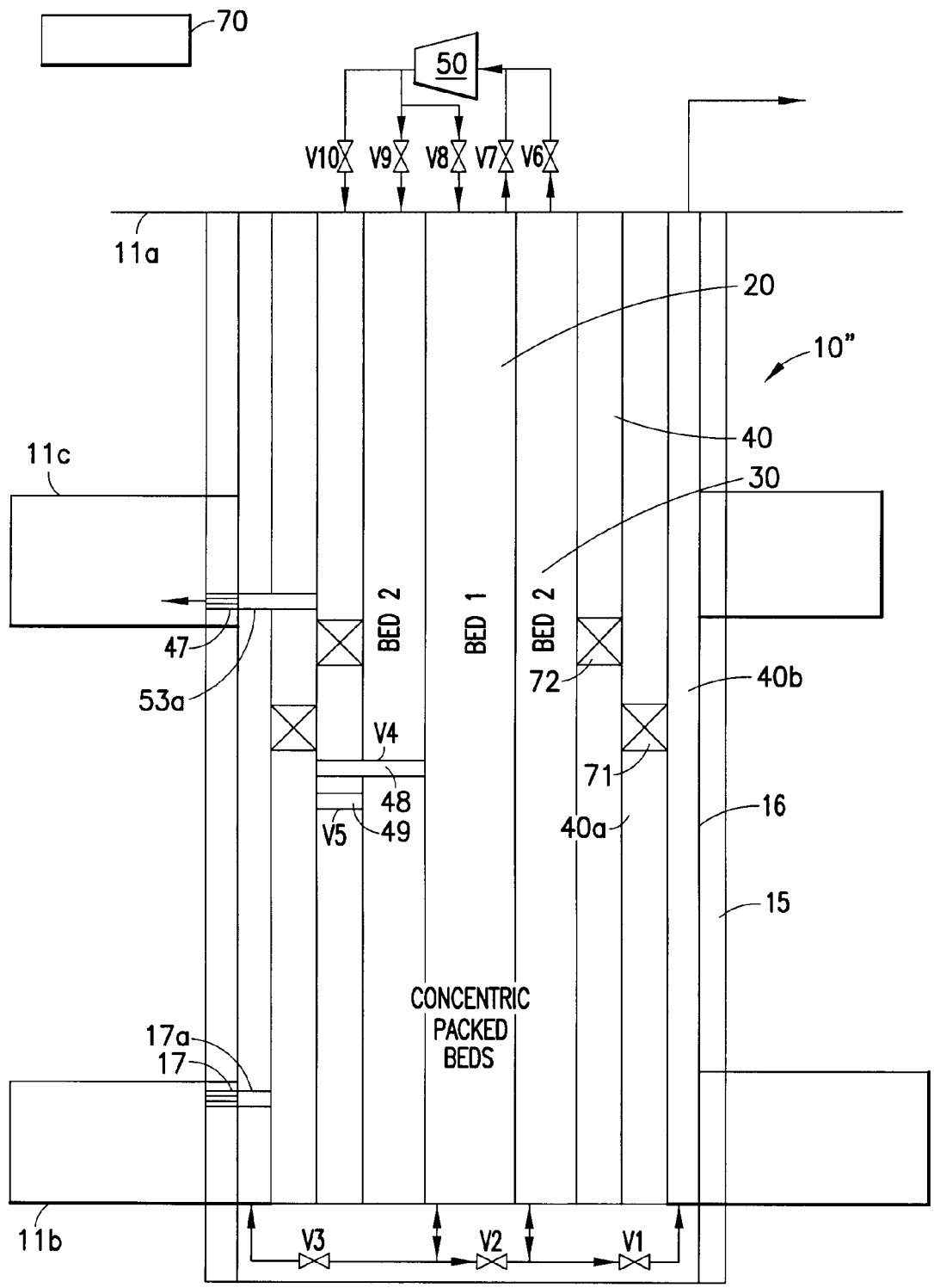
FIG. 3 is a schematic of a third embodiment of the invention for separation downhole of a natural gas-carbon dioxide mixture.

A third system 10" similar to systems 10 and 10' is seen in FIG. 3. In FIG. 3, elements which are the same as the elements of FIGS. 1 and 2 are provided with the same reference numbers. The primary differences between system 10" and system 10' are (i) the relocation of valves V1, V2, and V3 (preferably formed as a pre-assembly) downhole in the well 15 and the relocation of valves V6, V7, V8, V9, V10, and the compressor 50 to the formation surface 11a; (ii) the provision of different packers 71, 72; the provision of another annulus tube(s) 40a and 40b; and (iv) the provision of the source gas feed into the high pressure bed as opposed to the low pressure bed. Additional differences include a coupling between the production zone 11b and annulus 40a via pipe 17a through annulus 40b, and a coupling between purified carbon dioxide annulus 40 and the sequestration zone 11c of the formation through annulus 40a and 40b utilizing pipe 53a. It should be noted that if the beds 20, 30 are arranged such that the source gas from zone 11b is at or near the middle of the beds, annulus 40a and packer 71 can be eliminated.

By providing an unpacked annulus 40b for natural gas, and by feeding the source gas into the relative high pressure bed, relocation of the valves and the compressor 50 is possible. More particularly, assuming to start that bed 20 is the high pressure bed, the source gas is fed from source 11b, through perforation 17 and tube 17a into the annulus 40a (up to packer 71) and via valve V4 to the bed 20, and pressurized purified carbon dioxide is fed via valve V8 to the top of bed 20, the gas flow in bed 20 will be downward. In the high pressure bed, carbon dioxide will be adsorbed while natural gas is desorbed and pushed out. As a result, purified natural gas will be generated at the bottom of bed 20. The natural gas is primarily fed via valve V3 (which is open) to the unpacked annulus 40b, where it travels uphole (past any interrupting pipes) to the surface for output as desired product. In addition, some of the purified natural gas is fed via valve V2 (which is open) into the lower pressure bed 30 where the gas flow is upwards. The methane fed into the lower pressure bed 30 regenerates the bed 30 and is adsorbed while carbon dioxide is desorbed and pushed out. Thus, purified carbon dioxide exits bed 30 from the top of the bed via valve V6 and is compressed by the compressor 50 located at the surface of the formation. The carbon dioxide is primarily fed via valve V10 into annulus 40a for injection via tube 53a and perforation 47 into the sequestration zone 11c of the formation. Packer 72 is now located just below the zone 11c level so that the purified carbon dioxide is properly directed through tubing 53a for sequestration. In addition, some pressurized purified carbon dioxide is fed pursuant to the dual reflux PSA technique back into the higher pressure bed 20 via valve V8 as previously mentioned.

At some point in time, when the purity of the natural gas exiting valve V1 (or the purity of the carbon dioxide exiting valve V6) decreases to a threshold level, the beds 20, 30 are swapped, such that the source gas is forwarded via valve V5 (with valve V4 now closed) to bed 30 which is made the high pressure bed by opening valve V9 and closing valve V8. At the same time, valves V3 and V6 are closed, and valves V1 and V7 are opened. System 10" then functions substantially as previously described with purified natural gas exiting higher pressure bed 30 and being provided to annulus 40b via valve V1 and to the lower pressure bed 20 via valve V2, and purified carbon dioxide exiting lower pressure bed 20 via valve V7, being compressed by compressor 50, and being fed via valve V10 to tube 40 for sequestration in zone 11c and to the top of bed 30 via valve V9.

System 10" of FIG. 3 is advantageous relative to systems 10 and 10' of FIGS. 1 and 2 in that the compressor 50 may be located on the surface. It is also more advantageous in that compressor 50 will use considerably less power. In an ideal situation, the power consumed by compressor 50 may be reduced to zero if the high-pressure bed can be operated at the formation pressure of the source material (bed 11b) and the low-pressure bed can be operated at the formation pressure of the sequestration zone 11c. However, system 10" is less advantageous relative to systems 10 and 10' in requiring an additional pipe (40b) for the natural gas.

Figure 4A:
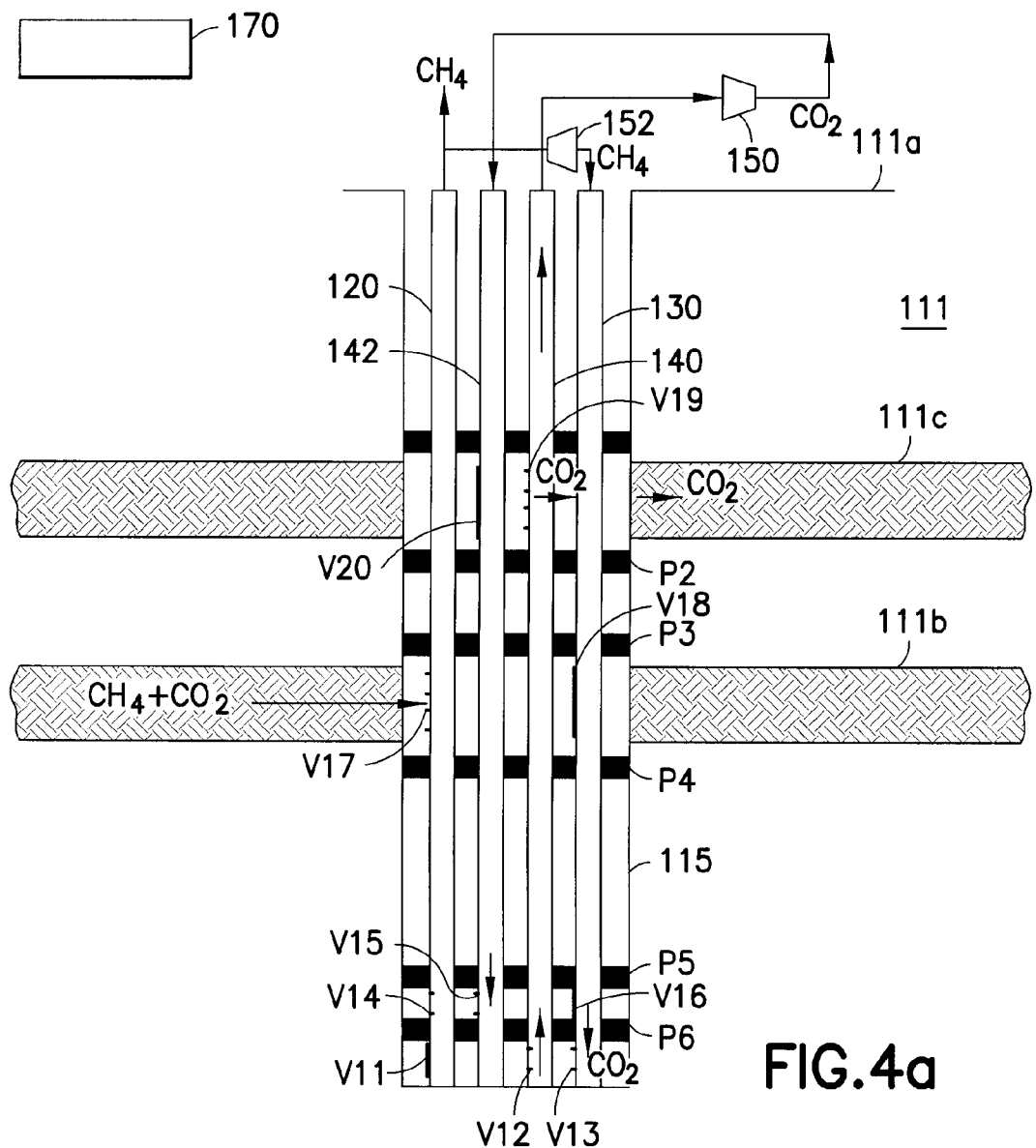
Figure 4C:
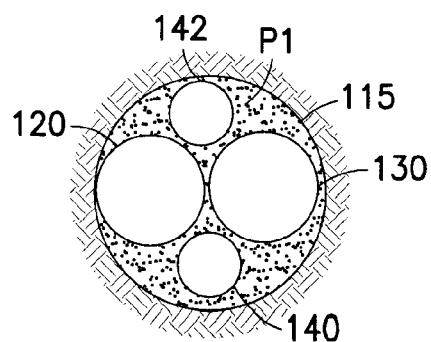

Turning now to FIGS. 4a and 4b, another system 110 is provided for implementing a dual reflux PSA process which separates a mixture of natural gas and carbon dioxide downhole, and which produces the natural gas and sequesters the carbon dioxide downhole. System 110 is located in a formation 111 which includes surface 111a, production layer 111b, and sequestration layer 111c. Cased well 115 traverses the formation. The system broadly comprises four substantially parallel pipes or tubes within the casing 115 including a first PSA packed bed 120, a second PSA packed bed 130, and purified unpacked CO2 pipes 140, 142, valves V11-V19 (with valves V12, V15 and V20 optionally being replaced by openings in the pipes), optional valve V20, packers P1-P6, a compressor 150, an expander 152, and a controller 170. The pipes 120, 130, 140, 142 all extend through the packers P1-P6, and are preferably arranged in a square configuration as seen in FIG. 4c. As seen in FIG. 4c, the pipes may be of different sizes, with the beds 120, 130 typically being of larger diameter than the pipes 140, 142. The system 110 of FIGS. 4a and 4b, which is a presently preferred embodiment, is identical in both FIGS. 4a and 4b. However, FIG. 4a is provided to show the status of the valves in one portion of the dual reflux PSA cycle, while FIG. 4b is provided to show the status of the valves during a second portion of the dual reflux PSA cycle. In FIGS. 4a and 4b vertical dots are on the edge of a pipe are used to indicate an open valve or openings in the pipe, while a vertical dark bar is used to indicate a closed valve. The valves may be controlled from uphole (at the formation surface) by wiring the valves with wires (not shown) typically running external the pipes and through the packers and coupled to a controller 170.

In FIG. 4a, PSA bed 120 is the higher pressure bed, PSA bed 130 is the lower pressure bed, and valves V11, V16, and V18 are closed, while valves V12, V13, V14, V15, V17, and V19 (or V20) are open. Source gas from production layer 111b is provided to the middle of bed 120 via perforations (not shown) in the casing 115 between packers P3 and P4 and via open valve V17 As will be described hereinafter, high pressure purified CO2 is provided to the bottom of bed 120. Because bed 120 is the higher pressure bed, carbon dioxide is adsorbed while CH4 is desorbed and pushed out. Thus, the output of bed 120 is purified CH4. Much of the purified CH4 is taken as an output product. Some of the CH4 is applied to the expander 152 in order to reduce the pressure of the methane, and the output of expander 152 is lower pressure purified methane which is reinjected into the lower pressure bed 130. Some of the power derived from the expander can be used to at least partially drive the compressor.

As will be appreciated from the previous discussion with respect to the other embodiments of the invention, in the lower pressure bed 130, the methane is preferentially adsorbed while the carbon dioxide is desorbed and pushed out. Thus, purified carbon dioxide is obtained at the bottom of bed 130, and the carbon dioxide transfers from bed 130 to pipe 140 via open valves V13 and V12 (valve V11 being closed). Packer P6 and the bottom of system 110 prevent the carbon dioxide leaving valve V13 from escaping. The carbon dioxide then travels up pipe 140 where some of it is injected via valve V19 into sequestration layer 111c of the formation (if it is at sufficient pressure). Here packers P1 and P2 prevent the carbon dioxide from traveling elsewhere. The remainder of the carbon dioxide travels to the surface 111a of the formation where it is compressed by compressor 150 and fed as higher pressure purified carbon dioxide into pipe 142. At the bottom of pipe 142 between packers P5 and P6, valve V15 is open and communicates with valve V14 located on bed 120 (valve V16 on bed 130 being closed). Thus, high pressure purified carbon dioxide is provided to the bottom of bed 120 as previously indicated.

At some point in time, either when the purity of the natural gas exiting PSA bed 120 (or the purity of the carbon dioxide exiting pipe 140) decreases to an undesired level, or after a predetermined length of time, or after a predetermined amount of natural gas has been taken as desired product, the beds 120, 130 are swapped. As seen in FIG. 4b, swapping is accomplished by closing valves V13, V14 and V17, opening valves V11, V16, and V18, and by providing the output of bed 130 to the expander 152 and the output of the expander to tube 142 which is typically accomplished using a surface valving system (not shown) which is well known in the PSA arts. With valve V18 now open and valve V17 now closed between packers P3 and P4, the source gas is provided to the middle of now higher pressure bed 130, which also receives pressurized purified CO2 gas at the bottom of the bed as discussed below. At a higher pressure, the methane adsorbed in bed 130 is desorbed while carbon dioxide is adsorbed. As a result, purified methane exits the pipe of bed 130. Much of the purified CH4 is taken as an output product. Some of the CH4 is applied to the expander 152 which can supply part of the power required to run the compressor, and the output of expander 152 is lower pressure purified methane which is reinjected into the lower pressure bed 120.

In the lower pressure bed 120, the methane is preferentially adsorbed while the carbon dioxide is desorbed and pushed out. Thus, purified carbon dioxide is obtained at the bottom of bed 120, and the carbon dioxide transfers from bed 120 to pipe 140 via open valves V11 and V12 (valve V13 being closed). Packer P6 and the bottom of system 110 prevent the carbon dioxide leaving valve V11 from escaping. The carbon dioxide then travels up pipe 140 where some of it is injected via valve V20 into sequestration layer 111c of the formation (if it is at sufficient pressure). Here packers P1 and P2 prevent the carbon dioxide from traveling elsewhere. The remainder of the carbon dioxide travels to the surface 111a of the formation where it is compressed by compressor 150 and fed as higher pressure purified carbon dioxide into pipe 142. Carbon dioxide may be injected into the formation 111c through valve V20 if the carbon dioxide was considered to be at too low a pressure to be injected through valve V19. At the bottom of pipe 142 between packers P5 and P6, valve V15 is open and communicates with valve V16 located on bed 30 (valve V14 on bed 20 being closed). Thus, high pressure purified carbon dioxide is provided to the bottom of bed 30 as previously indicated.

The swapping continues back and forth as one bed produces purified natural gas at the top of the well 115, and the other bed produces purified carbon dioxide in the well 115 at the bottom of the bed. The system is run in a balanced manner (equilibrium) such that the amount of gas entering the well (i.e., the total of the natural gas and carbon dioxide in the source mixture) is equal to the total of the natural gas taken as product plus the carbon dioxide gas injected into sequestration zone 111c.

Optional valve V21 is shown closed in both FIGS. 4a and 4b and is provided for the circumstance when the pressure at the carbon dioxide sequestration layer 111c is near, at, or above the pressure of the production layer 111b. Optional valve V21 could be opened (and valve V20 closed or eliminated) so that the CO2 would be injected into the sequestration layer after it is compressed by the compressor 152.

It will be appreciated by those skilled in the art that if desired, it is possible to modify system 110 to reduce the number of pipes in the system to three by locating the compressor 150 downhole, and arranging the system 110 to mimic system 10 of FIG. 1.

FIG. 5 shows one embodiment of the valves V11-V20. More particularly, the valves are implemented by providing the tubes an opening O, and providing a sliding collar C which can extend over a part or over the entire opening O. If desired, multiple openings can be defined in the tubes, and the collar can be moved to extend over none, one, some, or all of those openings. If the collar C is extended over none of the openings, the valve is completely open. If the collar C is extended over all of the openings, the valve is completely closed. If the collar is extended over more than none and less than all of the openings, the valve is partly open and may be used to throttle flow.

There have been described and illustrated herein several embodiments of a system for the downhole separation of formation gases where carbon dioxide gas is sequestered downhole and where natural gas is produced, and method of using the systems. While particular embodiments of the invention have been described, it is not intended that the invention be limited thereto, as it is intended that the invention be as broad in scope as the art will allow and that the specification be read likewise. Thus, while particular materials for the PSA beds have been disclosed, it will be appreciated that other materials could be used as well. Also, while metal and fiberglass tubes have been disclosed for the PSA beds and for the other pipes, it will be appreciated that tubes made of other materials such as composites could be utilized. Further, while the source gas was described as preferably being supplied to the middle portions of the adsorption beds, it will be appreciated that depending upon the makeup of the source gas, the gas may be provided closer to one end or other of the bed. Also, while the beds are shown as extending from the surface 11a of the formation down to at least the source layer of the formation, it will be appreciated that the beds may be extended out of the formation. It will therefore be appreciated by those skilled in the art that yet other modifications could be made to the provided invention without deviating from its spirit and scope as claimed.

What is claimed is:

1. A system for the downhole separation of carbon dioxide from natural gas produced from natural gas reservoirs in a formation traversed by a completed well and having a sequestration layer, comprising:

a dual reflux pressure swing adsorption (PSA) system with two packed PSA beds contained in PSA tubes located in the well generally maintained at different pressures relative to each other during operation and having top, bottom and middle portions, each middle portion receiving at different times from the formation a mixture of the carbon dioxide and natural gas, wherein said PSA beds generate purified carbon dioxide and purified natural gas from the mixture, the top portions of said PSA beds adapted to receive one at a time some of at least one of said purified natural gas and said purified carbon dioxide, and the bottom portions of said PSA beds adapted to receive one at a time at least some of the other of purified natural gas and purified carbon dioxide; and at least one additional tube adjacent at least one of said PSA tubes for carrying said purified carbon dioxide to the sequestration layer.

2. A system according to claim 1, further comprising:
a compressor coupled to said purified carbon dioxide, wherein said compressor compresses said purified carbon dioxide for reinjection into either said top portion or said bottom portion of said packed PSA beds one at a time.

3. A system according to claim 2, wherein:
said compressor is located at said surface of said formation.

4. A system according to claim 3, wherein:
said mixture is always provided to the higher pressure bed of said PSA beds, and
said purified natural gas is taken from said top portions of said PSA beds and said purified carbon dioxide is taken from said bottom portions of said PSA beds.

5. A system according to claim 4, wherein:
said PSA beds are adjacent each other and said at least one additional tube comprises at least two additional tubes adjacent said PSA beds, a first of said two additional tubes taking said purified carbon dioxide from said bottom portion of said PSA bed and bringing it to said compressor, and a second of said two tubes taking said purified carbon dioxide from said compressor to the bottom portion of the PSA bed receiving the purified natural gas.

6. A system according to claim 5, further comprising:
a plurality of packers through which said PSA tubes and said at least two additional tubes extends.

7. A system according to claim 6, further comprising:
a plurality of valves coupled to said PSA tubes and to said at least two additional tubes.

8. A system according to claim 7, wherein:
said plurality of valves includes a first valve coupled to said middle portion of said first of said PSA tubes and a second valve coupled to said middle portion of said second of said PSA tubes, said first valve and said second valve respectively coupling said middle portions of said PSA tubes to the mixture of the carbon dioxide and natural gas of the formation.

9. A system according to claim 8, wherein:
said plurality of valves includes a third valve coupled to said bottom portion of a first of said PSA tubes, and a fourth valve coupled to said bottom portion of a second of said PSA tubes, said third and fourth valves placing said PSA tubes in communication with said first of said at least two additional tubes for transferring purified carbon dioxide from said PSA beds to said first of said at least two additional tubes.

10. A system according to claim 9, wherein:
said plurality of valves includes a fifth valve coupled to a bottom portion of said first of said PSA beds and a sixth valve coupled to a bottom portion of said second of said PSA beds, wherein said second of said at least two additional tubes is in communication with said fifth valve and said sixth valve for transferring compressed purified carbon dioxide to said bottom portions of said PSA beds.

11. A system according to claim 10, wherein:
a first and a second of said plurality of packers straddle said first valve and said second valve, and a third and a fourth of said plurality of packers straddle either said third and fourth valves or said fifth and sixth valves.

12. A system according to claim 3, wherein:
said mixture is always provided to the higher pressure bed of said PSA beds,
said purified natural gas is taken from said bottom portions of said PSA beds and said purified carbon dioxide is taken from said top portions of said PSA beds,
said PSA tubes are concentric,
said at least one additional tube for carrying said purified carbon dioxide is concentric with said PSA tubes, and
said system further comprises a second additional tube concentric with said PSA tubes and said at least one additional tube, said second additional tube for carrying purified natural gas from said bottom portions of said PSA beds to a surface of the formation.

13. A system according to claim 12, further comprising:
a packer located at the sequestration layer.

14. A system according to claim 2, wherein:
said mixture is always provided to the lower pressure bed of said PSA beds,
said purified natural gas is taken from said top portions of said PSA beds and said purified carbon dioxide is taken from said bottom portions of said PSA beds,
said PSA tubes are concentric,
said at least one additional tube for carrying said purified carbon dioxide is concentric with said PSA tubes, and
said at least one additional tube includes a packer located at the sequestration layer.

15. A system according to claim 14, wherein:
said compressor is located in the completed well.

16. A system for the production, through a completed well traversing a formation, of natural gas from a production layer in the formation containing natural gas and carbon dioxide, and for sequestration of the carbon dioxide into a sequestration layer in the formation comprising:
at least three substantially parallel tubes located in the well, said at least three substantially parallel tubes including two packed pressure swing adsorption (PSA) beds and at least one tube for purified compressed carbon dioxide;
a compressor coupled to said at least one tube for purified compressed carbon dioxide and to said PSA beds;
a plurality of valves at least some of which are located in the completed well, a first of said valves coupled to a middle portion of a first of said PSA beds and to the production layer, a second of said valves coupled to a middle portion of a second of said PSA beds and to the production layer, a third of said valves coupled to a first of said PSA beds and to said compressor, and a fourth of said valves coupled to a second of said PSA beds and to said compressor, wherein at any given time, one of said two PSA beds produces purified natural gas, and the other of said two PSA beds produces purified carbon dioxide; and
means associated with said tube for purified compressed carbon dioxide for directing said purified carbon dioxide into the sequestration layer of the formation.

17. A method for separating a mixture of carbon dioxide and natural gas produced from a natural gas reservoir in a formation traversed by a completed well and having a sequestration layer, comprising:
providing a dual reflux pressure swing adsorption (PSA) system with two packed PSA beds contained in PSA tubes having top, middle, and bottom portions;
locating said two packed PSA tubes and at least one additional tube in the well;
maintaining said two packed PSA beds at different pressures relative to each other during operation;
providing each middle portion of said PSA beds one at a time with the mixture of the carbon dioxide and natural gas from the reservoir, wherein said PSA beds generate purified carbon dioxide and purified natural gas from the mixture, and providing the top portions of said PSA beds one at a time with some of at least one of said purified natural gas and said purified carbon dioxide, and the bottom portions of said PSA beds one at a time with at least some of the other of purified natural gas and purified carbon dioxide;

obtaining said purified natural gas at a surface of the formation; and piping said purified carbon dioxide through said at least one additional tube for sequestration in the sequestration layer.

18. A method according to claim 17, further comprising:

compressing at least some of said purified natural gas and providing at least some of the compressed purified natural gas to a higher pressure bed of said two packed PSA beds.

19. A method according to claim 17, wherein:

said PSA beds are adjacent each other and said at least one additional tube comprises at least two additional tubes adjacent said PSA beds, a first of said two additional tubes taking said purified carbon dioxide from said bottom portion of said PSA bed and bringing it to a compressor, and a second of said two tubes taking said purified carbon dioxide from the compressor to the bottom portion of the PSA bed receiving the purified natural gas.

20. A method according to claim 17, wherein:

said PSA tubes are concentric, and said at least one additional tube for carrying said purified carbon dioxide is concentric with said PSA tubes.

* * * * *